United States Patent
Faruque et al.

(10) Patent No.: US 9,718,498 B1
(45) Date of Patent: Aug. 1, 2017

(54) VEHICULAR BODY STRUCTURE

(71) Applicant: FORD GLOBAL TECHNOLOGIES, LLC, Dearborn, MI (US)

(72) Inventors: Mohammed Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/094,318

(22) Filed: Apr. 8, 2016

(51) Int. Cl.
*B62D 25/00* (2006.01)
*B62D 25/02* (2006.01)
*B62D 25/06* (2006.01)
*B62D 25/04* (2006.01)
*B62D 27/02* (2006.01)

(52) U.S. Cl.
CPC ............. *B62D 25/02* (2013.01); *B62D 25/04* (2013.01); *B62D 25/06* (2013.01); *B62D 27/02* (2013.01)

(58) Field of Classification Search
CPC ..... B62D 29/04; B62D 29/001; B62D 29/005
USPC .......................................... 296/181.2, 901.01
See application file for complete search history.

(56) References Cited

U.S. PATENT DOCUMENTS

| | | | | | |
|---|---|---|---|---|---|
| 2,768,023 A | * | 10/1956 | Landon | ................... | B60J 7/106 296/118 |
| 3,083,501 A | * | 4/1963 | Balthazor | .............. | A63H 17/26 446/471 |
| 3,084,973 A | * | 4/1963 | Beckley | .................... | B60P 3/32 264/257 |
| 3,409,323 A | * | 11/1968 | Schweser | ............... | B62D 29/00 296/181.2 |
| 3,427,068 A | * | 2/1969 | Keahn | ...................... | B60J 7/106 296/210 |
| 5,009,463 A | * | 4/1991 | Saitoh | .................... | B60J 5/0473 296/193.06 |
| 5,362,345 A | * | 11/1994 | Stettler | ................. | B29C 53/583 105/396 |
| 6,092,472 A | * | 7/2000 | Thoman | ............... | B61D 17/005 105/396 |
| 6,299,246 B1 | * | 10/2001 | Tomka | ............. | B29C 45/14631 264/250 |
| 6,457,768 B1 | * | 10/2002 | Schroeder | ............ | B62D 29/043 296/191 |
| 7,032,958 B2 | | 4/2006 | White et al. | | |
| 7,287,797 B1 | * | 10/2007 | Belloso | .................. | B62D 21/03 296/181.2 |

(Continued)

FOREIGN PATENT DOCUMENTS

CN 104590397 A 5/2015
DE 102008036893 A1 2/2010

(Continued)

*Primary Examiner* — Dennis H Pedder
(74) *Attorney, Agent, or Firm* — Jason Rogers; Brooks Kushman P.C.

(57) ABSTRACT

A vehicle body includes a roof panel and a first bodyside panel. The roof panel includes first and second side regions. The first bodyside panel includes top and bottom regions. The roof panel and first bodyside panel define a continuous exterior surface region. The continuous exterior surface region extends from the first side region of the roof panel to the bottom region of the first bodyside panel through the second side region of the roof panel and top region of the first bodyside panel.

18 Claims, 2 Drawing Sheets

(56) References Cited

U.S. PATENT DOCUMENTS

| | | | | |
|---|---|---|---|---|
| 7,448,576 B2* | 11/2008 | Druckman | ............... | B29C 53/66 |
| | | | | 105/316 |
| 7,806,463 B2* | 10/2010 | Oliver | ....................... | B60P 3/36 |
| | | | | 296/168 |
| 8,690,226 B2* | 4/2014 | Ellis | ........................ | B29C 41/06 |
| | | | | 296/181.2 |
| 2012/0068496 A1* | 3/2012 | Ellis | ........................ | B29C 41/06 |
| | | | | 296/181.1 |
| 2016/0137229 A1* | 5/2016 | Nishida | .................. | B62D 23/00 |
| | | | | 296/181.2 |

FOREIGN PATENT DOCUMENTS

| | | |
|---|---|---|
| FR | 2662134 B1 | 12/1993 |
| JP | H05155366 A | 6/1993 |
| JP | 2001301652 A | 10/2001 |
| WO | 2015044076 A1 | 4/2015 |

\* cited by examiner

VEHICULAR BODY STRUCTURE

TECHNICAL FIELD

The present disclosure relates to vehicular body and frame structures.

BACKGROUND

The body of a vehicle includes a roof panel and two bodyside outer panels. The bodyside outer panels include the pillar structures and define openings to receive windows or doors. The bodyside outer panels and the roof panel may be stamped components that are connected to each other by fasteners or a series of welds.

SUMMARY

A vehicle body includes a roof panel and a first bodyside panel. The roof panel includes first and second side regions. The first bodyside panel includes top and bottom regions. The roof panel and first bodyside panel define a continuous exterior surface region. The continuous exterior surface region extends from the first side region of the roof panel to the bottom region of the first bodyside panel through the second side region of the roof panel and top region of the first bodyside panel.

A vehicle body includes a roof panel and a pillar. The roof panel includes first and second side regions. The pillar includes top and bottom regions. The roof panel and pillar define a continuous exterior surface region. The continuous exterior surface region extends from the first side region of the roof panel to the bottom region of the pillar through the second side region of the roof panel and top region of the pillar.

A vehicle body includes a roof panel and a bodyside panel. The roof panel defines a top surface. The bodyside panel includes top and bottom regions. The roof and bodyside panel collectively define successive layers of material. The successive layers of material are sequentially arranged in a stacked formation that extends from the bottom region of the bodyside panel to the top surface of the roof panel, including the top region of the bodyside panel and the roof panel.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Any of the embodiments described below may be produced by any additive manufacturing process. Additive manufacturing may also be referred to as 3-D printing. The additive manufacturing processes that may be used to produce any of the embodiments described below include, but are not limited to, fused deposition modeling (FDM), fused filament fabrication (FFF), robocasting or direct ink writing (DIW), powder bed and inkjet head 3D printing (3DP), electron-beam melting (EBM), selective laser melting (SLM), selective heat sintering (SHS), selective laser sintering (SLS), direct metal laser sintering (DMLS), directed energy deposition, and electron beam freeform fabrication (EBF).

Figure 1:
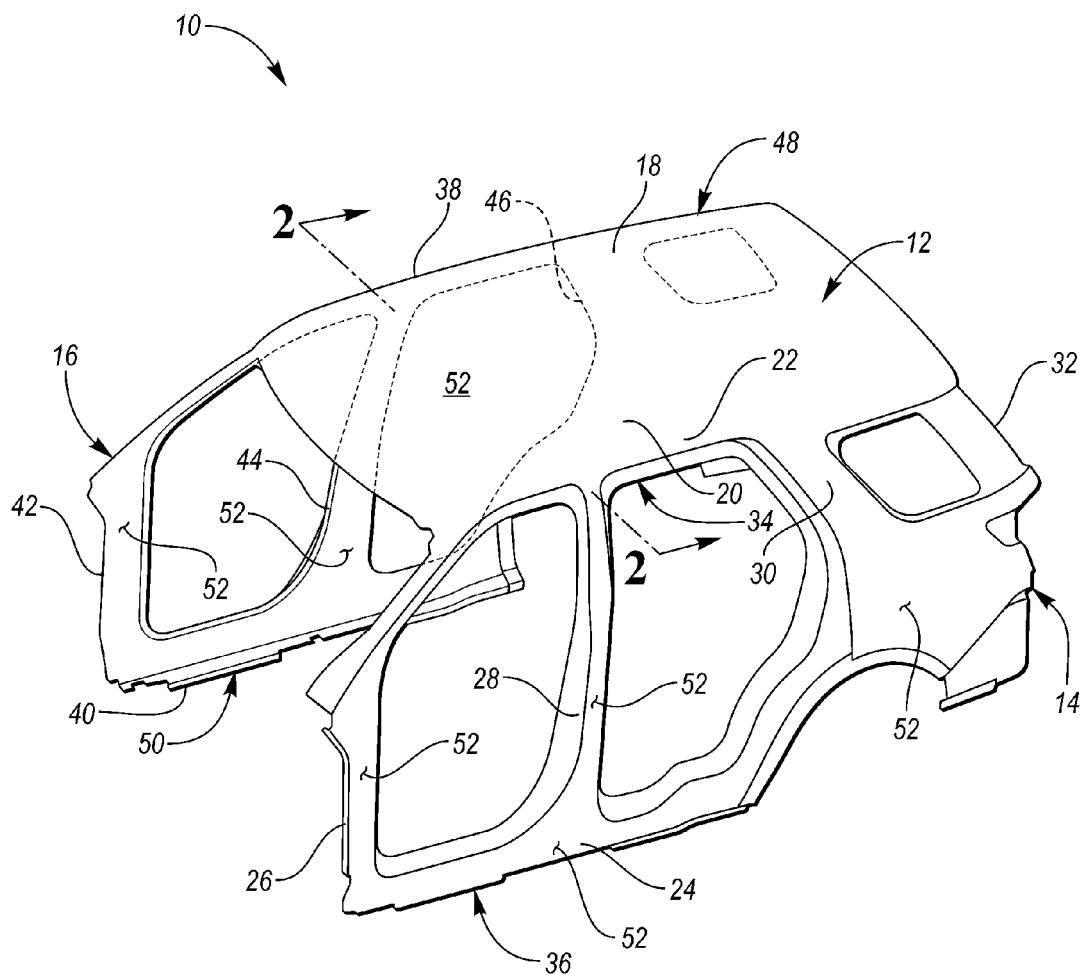
FIG. 1 is a perspective view of a vehicle body.

Referring to FIG. 1, a vehicle body 10 is illustrated. The vehicle body 10 comprises a roof panel 12, a first bodyside panel 14 and a second bodyside panel 16. The roof panel 12 includes a first side region 18 and a second side region 20. The first bodyside panel 14 includes a top region 22 and a bottom region 24. The first bodyside panel 14 may include an A-pillar 26, B-pillar 28, C-pillar 30, D-pillar 32, roof rail 34, and rocker panel 36. The A-pillar 26, B-pillar 28, C-pillar 30, and D-pillar 32 may include top and bottom regions that correspond to the top region 22 and bottom region 24 of the first bodyside panel 14. The A-pillar 26, B-pillar 28, and C-pillar 30 may extend between the roof rail 34 and the rocker panel 36. The second bodyside panel 16 includes a top region 38 and a bottom region 40. The second bodyside panel 16 may also include an A-pillar 42, B-pillar 44, C-pillar 46, D-pillar (not shown), roof rail 48, and rocker panel 50. The A-pillar 42, B-pillar 44, C-pillar 46, and D-pillar may include top and bottom regions that correspond to the top region 38 and bottom region 40 of the second bodyside panel 16. The A-pillar 42, B-pillar 44, and C-pillar 46 may extend between the roof rail 48 and the rocker panel 50. The first bodyside panel 14 and second bodyside panel 16 may each define a plurality of orifices that are configured to receive doors or windows. The first bodyside panel 14 and second bodyside panel 16 may each also define wheel wells.

The first bodyside panel 14 or any region of the first bodyside panel 14 may be substantially perpendicular to the roof panel 12. More specifically, the A-pillar 26, B-pillar 28, C-pillar 30, D-pillar 32, roof rail 34, rocker panel 36, and/or any portions thereof may be substantially perpendicular to the roof panel 12. The second bodyside panel 16 or any region of the second bodyside panel 16 may also be substantially perpendicular to the roof panel 12. More specifically, the A-pillar 42, B-pillar 44, C-pillar 46, D-pillar, roof rail 48, rocker panel 50, and/or any portions thereof may be substantially perpendicular to the roof panel 12. Substantially perpendicular may refer to 90° plus or minus 10° (this includes any incremental value between 80° and 100°).

Figure 2:
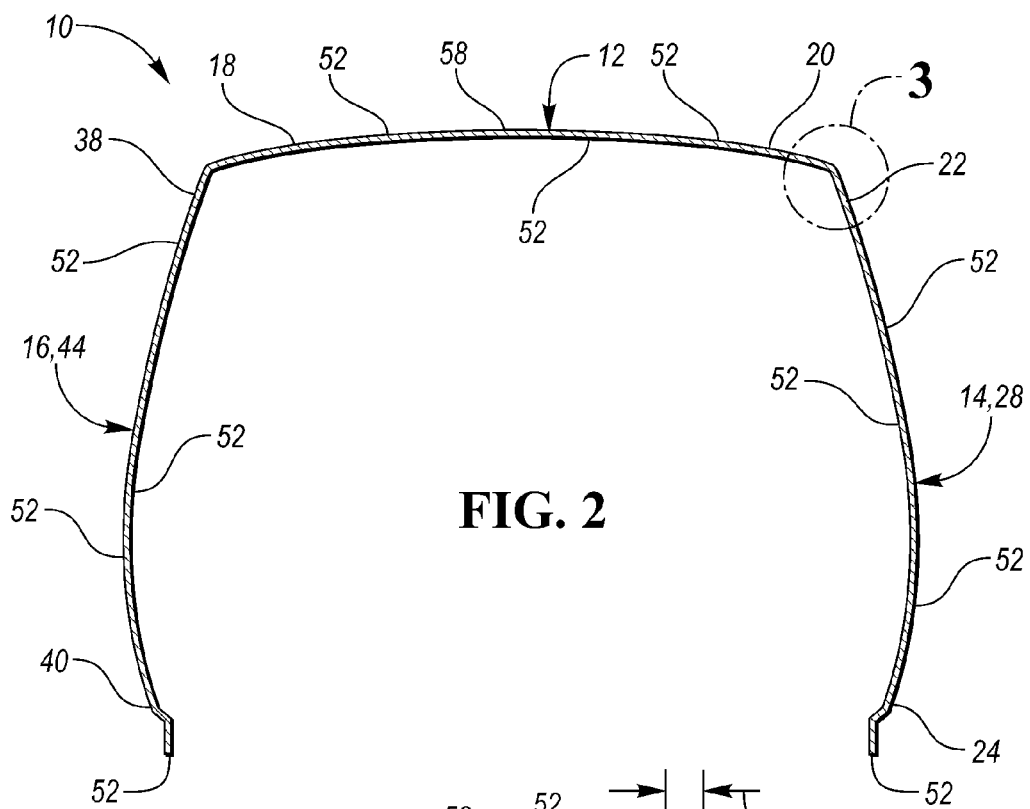
FIG. 2 is cross-sectional view taken along line 2-2 in FIG. 1.

Referring to FIG. 2, a cross-sectional view taken along line 2-2 in FIG. 1 is illustrated. The cross-sectional view extends from the first bodyside panel 14 to the second bodyside panel 16 through the roof panel 12. The roof panel 12 and the first bodyside panel 14 may define a continuous cross-sectional area. The roof panel 12 and the first bodyside panel 14 may also define a continuous exterior surface region 52. More specifically, the roof panel 12 and any of the components (or combination thereof) of the first bodyside panel 14, including the A-pillar 26, B-pillar 28, C-pillar 30, D-pillar 32, roof rail 34, and rocker panel 36, may define the continuous exterior surface region 52. The continuous exterior surface region 52 may comprise a surface that is not interrupted by any holes, gaps, splits, breaks, or spaces. More specifically, the continuous exterior surface region 52 may comprise a surface that is not interrupted by any holes, gaps, splits, breaks, or spaces between the roof panel 12 and the first bodyside panel 14. The continuous exterior surface region 52 may extend from the first side region 18 of the roof panel 12 to the bottom region 24 of the first bodyside panel 14 through the second side region 20 of the roof panel 12 and the top region 22 of the first bodyside panel 14.

The second bodyside panel 16, in addition the roof panel 12 and the first bodyside panel 14, may also define the continuous cross-sectional area and the continuous exterior surface region 52. More specifically, any of the components (or combination thereof) of the second bodyside panel 16, including the A-pillar 42, B-pillar 44, C-pillar 46, D-pillar, roof rail 48, and rocker panel 50, may also define the continuous exterior surface region 52. The continuous exterior surface region 52 may be referred as a second continuous exterior surface region when including the second bodyside panel 16 or any components thereof. The continuous exterior surface region 52, when including the second bodyside panel 16, may also comprise a surface that is not interrupted by any holes, gaps, splits, breaks, or spaces. More specifically, the continuous exterior surface region 52 may comprise a surface that is not interrupted by any holes, gaps, splits, breaks, or spaces between the roof panel 12 and the second bodyside panel 16, in addition to the surface not being interrupted by any holes, gaps, splits, breaks, or spaces between the roof panel 12 and the first bodyside panel 14. The continuous exterior surface region 52 may extend from the bottom region 24 of the first bodyside panel 14 through the top region 22 of the first bodyside panel 14, the roof panel 12, and the top region 38 of the second bodyside panel 16 to the bottom region 40 of the second bodyside panel 16.

Figure 3:
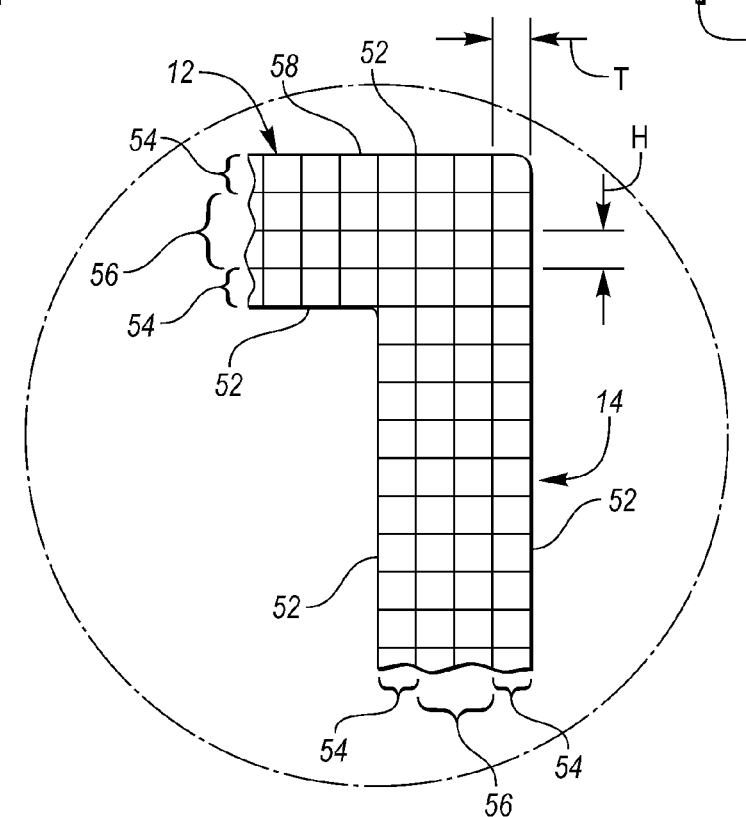
FIG. 3 is an enlarged view of the cross-section encompassed by Area 3 shown in FIG. 2.

FIG. 3 is an enlarged view of the cross-section encompassed by Area 3 shown in FIG. 2. The continuous exterior surface region 52 includes a surface layer 54 (or surface layers). A plurality of intermediate layers 56 is disposed below the surface layer 54 (or in-between surface layers). Although only two intermediate layers 56 are depicted, it should be understood that two or more intermediate layers 56 may be included. Therefore, two or more intermediate layers 56 should be construed as disclosed herein. The surface layer 54 and intermediate layers 56 may be formed of discrete or distinct layers of material. The layers of material may be formed by an additive manufacturing processes as described above.

The roof panel 12 and one or both of the first bodyside panel 14 and the second bodyside panel 16 may define successive layers of material that are sequentially arranged in a stacked formation that extends from the bottom region 24 of the first bodyside panel 14 (and/or bottom region 40 of the second bodyside panel 16) to a top surface 58 of the roof panel 12, including the top region 22 of the first bodyside panel 14 (and/or top region 38 of the second bodyside panel 16) and the roof panel 12.

Alternatively, the roof panel 12 and one or more of the elements of the first bodyside panel 14 and/or the second bodyside panel 16 (i.e., A-pillar, B-pillar, C-pillar, D-pillar, roof rail, and/or rocker panel) may define successive layers of material that are sequentially arranged in a stacked formation that extends from a bottom region of the specific element to top surface 58 of the roof panel 12 including a top region of the specific element and the roof panel 12.

Each of the discrete layers of material may be substantially uniform in thickness. Substantially uniform in thickness may refer to plus or minus 10% of a uniform thickness, T. This includes any incremental value between 90% and 110% of the uniform thickness, T. Each of the discrete layers of material may be substantially uniform in height. Substantially uniform in height may refer to plus or minus 10% of a uniform height, H. This includes any incremental value between 90% and 110% of the uniform Height, H. Although the discrete layers of material are shown to have a square cross-sectional shape, it should be understood that the cross-sectional of the discrete layers of material may have any desirable shape. For example the cross-sectional shape of the discrete layers of material may be a rectangular, circular, square or rectangular with rounded corners, shaped like a parallelogram, etc.

The enlarged view of the cross-section encompassed by Area 3 depicts the layers of material that extend in a direction that is into the paper upon which the figures are depicted (i.e., the layers of material extending in a direction that is perpendicular to the plane upon which the figures are depicted). Alternatively, layers of material may extend in a direction that is within the plane defined by the paper or at any incremental angle between the plane defined by the paper and the direction that is perpendicular to the plane defined by the paper. In addition, although each layer of material is shown to extend in the same direction, alternative embodiments may include layers that extend in different or alternating directions. For example, alternating layers may extend in directions that are perpendicular to each other.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle body comprising:
  a roof panel; and
  a first bodyside panel,
    the roof panel and first bodyside panel are collectively formed from a plurality of longitudinal members that extend longitudinally of the vehicle, wherein the longitudinal members are stacked vertically in columns, aligned horizontally in rows, and define a continuous exterior surface extending from a top of the roof panel to a bottom of the first bodyside panel.

2. The vehicle body of claim 1, wherein the continuous exterior surface includes a surface layer and a plurality of intermediate layers disposed inwardly of the surface layer.

3. The vehicle body of claim 1, wherein each column is substantially uniform in thickness.

4. The vehicle body of claim 1, wherein the first bodyside panel is substantially perpendicular to the roof panel.

5. The vehicle body of claim 1, further comprising a second bodyside panel.

6. The vehicle body of claim 5, wherein the roof panel, first bodyside panel, and second bodyside panel define the continuous exterior surface, wherein the continuous exterior surface extends from the bottom of the first bodyside panel, across the top of the roof panel, and to the bottom of the second bodyside panel.

7. The vehicle body of claim 5, wherein the second bodyside panel is substantially perpendicular to the roof panel.

8. A vehicle body comprising:
a roof panel; and
a pillar,
the roof panel and pillar are collectively formed from a plurality of longitudinal members that extend longitudinally of the vehicle body, wherein the longitudinal members are stacked vertically in columns, aligned horizontally in rows, and define a continuous exterior surface extending from a top of the roof panel to a bottom of the pillar.

9. The vehicle body of claim 8, wherein the continuous exterior surface includes a surface layer and a plurality of intermediate layers disposed inwardly of the surface layer.

10. The vehicle body of claim 8, wherein each column is substantially uniform in thickness.

11. The vehicle body of claim 8, wherein the pillar is substantially perpendicular to the roof panel.

12. The vehicle body of claim 8, further comprising a rocker panel, wherein the pillar extends between the roof panel and the rocker panel.

13. The vehicle body of claim 12, wherein the roof panel, pillar, and rocker panel define the continuous exterior surface, wherein the continuous exterior surface extends from the top of the roof panel, across the pillar, and to rocker panel.

14. A vehicle body comprising:
a roof panel defining a top surface; and
a bodyside panel,
the roof and bodyside panels are collectively formed from a plurality of longitudinal members, wherein the longitudinal members are stacked vertically in columns and aligned horizontally in rows to define successive layers of material sequentially arranged in a stacked formation extending from a bottom of the bodyside panel to the top surface of the roof panel.

15. The vehicle body of claim 14, wherein each row is substantially uniform in height.

16. The vehicle body of claim 1, wherein each row is substantially uniform in height.

17. The vehicle body of claim 8, wherein each row is substantially uniform in height.

18. The vehicle body of claim 14, wherein each column is substantially uniform in thickness.

\* \* \* \* \*